(12) United States Patent
Masuda

(10) Patent No.: US 7,519,040 B2
(45) Date of Patent: Apr. 14, 2009

(54) SYNCHRONIZATION JUDGING CIRCUIT CAPABLE OF OPERATING MODERATELY

(75) Inventor: Shuji Masuda, Tokyo (JP)

(73) Assignee: NEC Corporation, Tokyo (JP)

( * ) Notice: Subject to any disclaimer, the term of this patent is extended or adjusted under 35 U.S.C. 154(b) by 778 days.

(21) Appl. No.: 10/937,630

(22) Filed: Sep. 9, 2004

(65) Prior Publication Data

US 2005/0054309 A1 Mar. 10, 2005

(30) Foreign Application Priority Data

Sep. 10, 2003 (JP) ............................. 2003-317620

(51) Int. Cl.
*H04B 7/216* (2006.01)
(52) U.S. Cl. ..................................... 370/342
(58) Field of Classification Search ................. 370/342
See application file for complete search history.

(56) References Cited

U.S. PATENT DOCUMENTS 5,799,043 A 8/1998 Chang et al.
6,285,887 B1 * 9/2001 Mimura ....................... 455/522
7,072,680 B2 * 7/2006 Lee et al. ..................... 455/522
2003/0031135 A1 * 2/2003 Itoh ............................ 370/252

FOREIGN PATENT DOCUMENTS

| CN | 1415155 A | 4/2003 |
| EP | 1111815 A1 * | 6/2001 |
| JP | 53-82102 | 7/1978 |
| JP | 2002-9858 | 1/2002 |
| JP | 2003-152599 | 5/2003 |
| JP | 2004-72643 | 3/2004 |

* cited by examiner

*Primary Examiner*—Vincent P. Harper
*Assistant Examiner*—Marivelisse Santiago-Cordero
(74) *Attorney, Agent, or Firm*—Scully, Scott, Murphy & Presser, P.C.

(57) ABSTRACT

In a synchronization judging circuit, a measuring portion measures a signal to interference power ratio of a received signal at each frame. An averaging portion calculates a moving average of a series of signal to interference power ratios for a predetermined number of frames to produce a mean value at each frame. A counter counts a number of consecutive frames each of which the mean value meets a predetermined threshold requirement. The counter further compares a counted value with a predetermined threshold value to decide whether to perform a transmission control operation or not.

28 Claims, 10 Drawing Sheets

SYNCHRONIZATION JUDGING CIRCUIT CAPABLE OF OPERATING MODERATELY

This application claims priority to prior Japanese application JP 2003-317620, the disclosure of which is incorporated herein by reference.

BACKGROUND OF THE INVENTION

This invention relates to a synchronization judging circuit, in particular, to a synchronization judging circuit used in a W-CDMA (Wideband Code Division Multiple Access) portable terminal to judge, by the use of DPCCH (Dedicated Physical Control Channel)/DPDCH (Dedicated Physical Data Channel), whether synchronization is established or not.

A related portable terminal (or cellular phone) judges synchronization to be out and suspends transmission when a quality of DPCCH/DPDCH deteriorates under a first prescribed level. The portable terminal judges that the synchronization is established again and resumes the transmission when the quality of the DPCCH/DPDCH increases above a second prescribed level.

Concretely, the portable terminal measures DPCCH_Ec/Ior as the quality at every frame in a case where Ior/Ioc is equal to −1 [dB] at a receiving end thereof. The portable terminal judges the synchronization to be out and suspends the transmission when the Ior/Ioc is lower than a reference value Qout for 160 [ms]. Furthermore, the portable terminal judges that the synchronization is established again and resumes the transmission when the Ior/Ioc is higher than a reference value Qin for 160 [ms].

The portable terminal may use SIR (Signal to Interference power Ratio), which is measured at every frame, instead of the DPCCH_Ec/Ior to judge whether the synchronization is established or not. In this case, reference values for the SIR are obtained by converting the reference values Qout and the Qin for the DPCCH_Ec/Ior.

Hereinafter, the reference values of the SIR are renamed to Qout and Qin. That is, it is assumed that the synchronization judgment is executed by comparing the SIR with the Qout and the Oin. In addition, it is assumed that a period of 160 [ms] is equal to 16 frames. On the condition, the portable terminal operates as follows.

The portable terminal judges the synchronization to be out and suspends the transmission when the measured SIR is lower than the reference value Qout for 16 frames. Furthermore, the portable terminal judges that the synchronization is established again and resumes the transmission when the measured SIR is higher than the reference value Qin for 16 frames.

The SIR has dispersion (or short time variation) even during a short time such as one frame. Especially, the dispersion of the SIR becomes large when the portable terminal moves and/or communication environment is bad.

A related portable terminal meeting specifications of the W-CDMA system judges synchronization to be out and suspends transmission when the measured SIR is lower than the minimum SIR (i.e. Qout), which is decided to keep a call connection, for 16 frames. Furthermore, the related portable terminal meeting specifications of the W-CDMA judges that the synchronization is established again and resumes the transmission when the SIR is higher than the reference SIR (i.e. Qin), which is decided to connect a call, for 16 frames.

Even if the SIR is lower than the reference value Qout for the most part of continuous 16 frames, there is a case where the portable terminal continues the transmission. This is because the SIR exceeds the reference value Qout in a moment when it has large dispersion. Similarly, there is a case where the portable terminal does not resume the transmission when the SIR is higher than the reference value Qin for the most part of 16 frames. This is because the SIR deteriorates under the reference value Qin in a moment when it has the large dispersion.

SUMMARY OF THE INVENTION

It is therefore an object of this invention to provide a synchronization judging circuit capable of suppressing influence of dispersion (or short time variation) of SIR.

Other object of this invention will become clear as the description proceeds.

According to a first aspect of this invention, a synchronization judging circuit comprises a measuring portion to measure a signal to interference power ratio of a received signal at each frame. An averaging portion calculates a moving average of a series of signal to interference power ratios for a predetermined number of frames to produce a mean value at each frame. A counter counts a number of consecutive frames each of which the mean value meets a predetermined threshold requirement. The counter compares a counted value with a predetermined threshold value to decide whether to perform a transmission control operation or not.

According to a second aspect of this invention, a cellular phone includes a synchronization judging circuit. The synchronization judging circuit comprises a measuring portion to measure a signal to interference power ratio of a received signal at each frame. An averaging portion calculates a moving average of a series of signal to interference power ratios for a predetermined number of frames to produce a mean value at each frame. A counter counts a number of consecutive frames each of which the mean value meets a predetermined threshold requirement. The counter compares a counted value with a predetermined threshold value to decide whether to perform a transmission control operation or not.

PREFERABLE EMBODIMENTS

Figure 1:
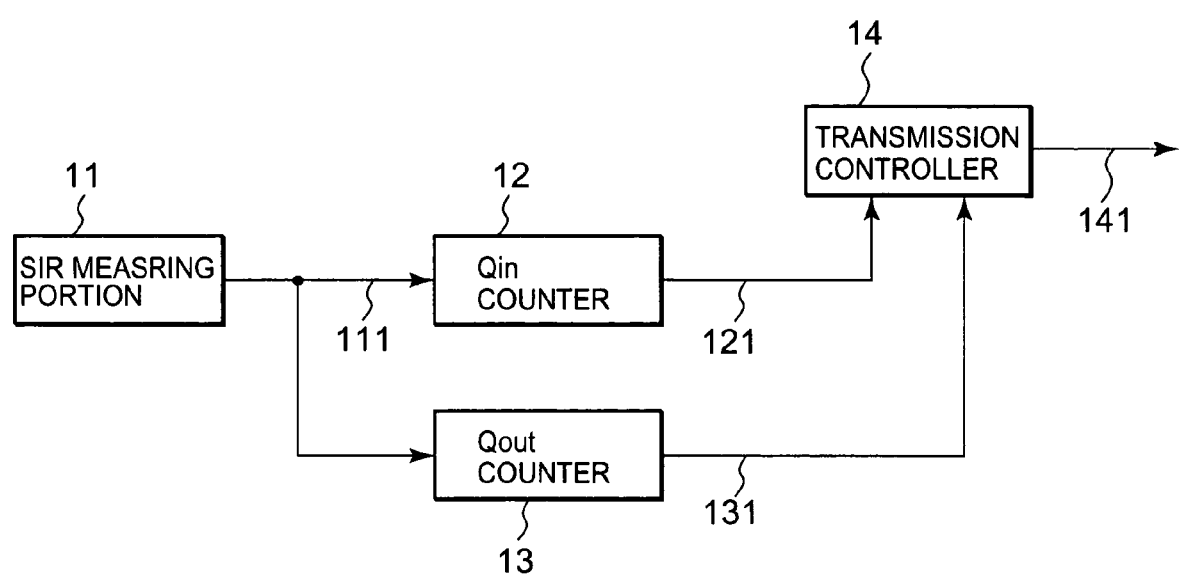
FIG. 1 is a block diagram of a related synchronization judging circuit.

Referring to FIG. 1, description will be at first directed to a related synchronization judging circuit for a better understanding of this invention.

The synchronization judging circuit is used in a cellular phone for a W-CDMA system. The cellular phone receives signals transmitted from a base station (not shown) by the use of a DPCCH (Dedicated Physical Control Channel), a DPDCH (Dedicated Physical Data Channel) and so on.

The synchronization judging circuit includes an SIR (Signal to Interference power Ratio) measuring portion 11, a Qin counter 12, a Qout counter 13 and a transmission controller 14.

The SIR measuring portion 11 measures an SIR of a received signal at every frame to produce a measured SIR signal 111 representing a measured SIR.

The Qin counter 12 is connected to the SIR measuring portion 11 and increases a counted value thereof by one whenever it receives the measured SIR signal 111 representing that the measured SIR is equal to or larger than a reference value Qin. The Qin counter 12 is cleared when the measured SIR signal 111 represents that the measured SIR is smaller than the reference value Qin. When the counted value of the Qin counter 12 is equal to a predetermined value such as "16", the Qin counter 12 supplies a transmission resumption signal 121 to the transmission controller 14.

The Qout counter 13 is connected to the SIR measuring portion 11 and increases a counted value thereof by one whenever it receives the measured SIR signal 111 representing that the measured SIR is equal to or smaller than a reference value Qout. The Qout counter 13 is cleared when the measured SIR signal 111 represents that the measured SIR is larger than the reference value Qout. When the counted value of the Qout counter 13 is equal to a predetermined value such as "16", the Qout counter 13 supplies a transmission suspension signal 131 to the transmission controller 14.

The transmission controller 14 is connected to both of the Qin counter 12 and the Qout counter 13. The transmission controller 14 produces a transmitter control signal 141 according to the transmission resumption signal 121 and the transmission suspension signal 131.

The related synchronization judging circuit compares the measured SIRs, one by one, with the reference values Qin and Qout. Therefore, the related synchronization judging circuit is easy to be influenced by dispersion (or short time variation) of the measured SIR. As a result, there is a case where the related synchronization judging circuit executes improper transmission control.

Figure 2:
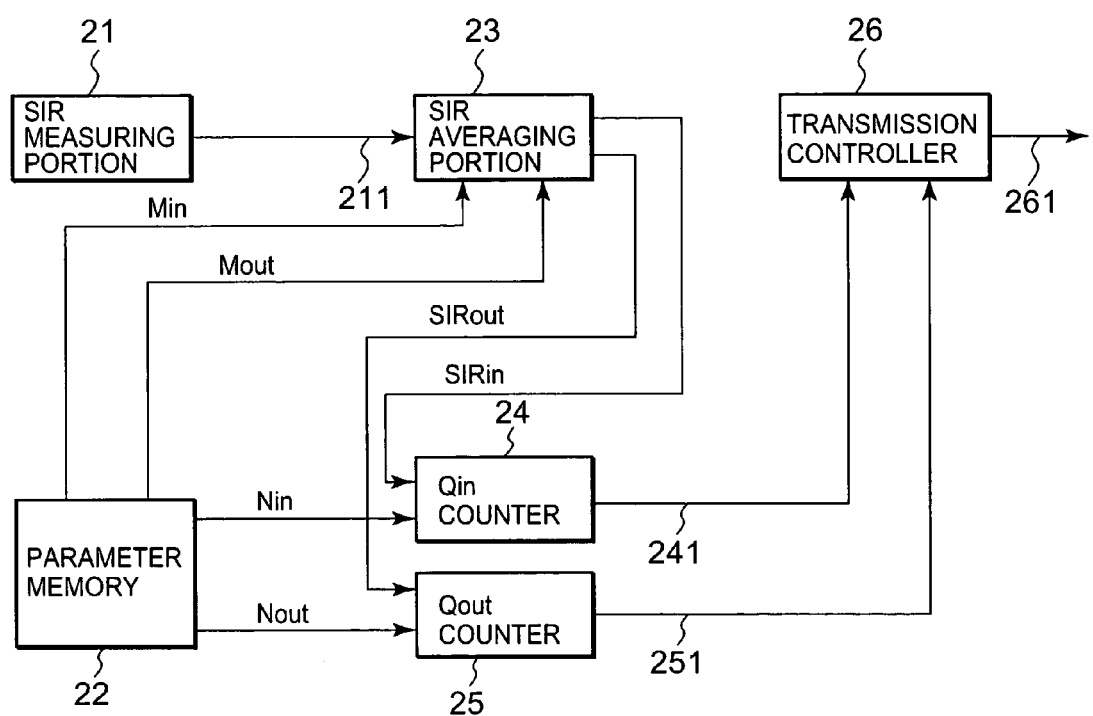
FIG. 2 is a block diagram of a synchronization judging circuit according to a first embodiment of this invention.
Figure 3:
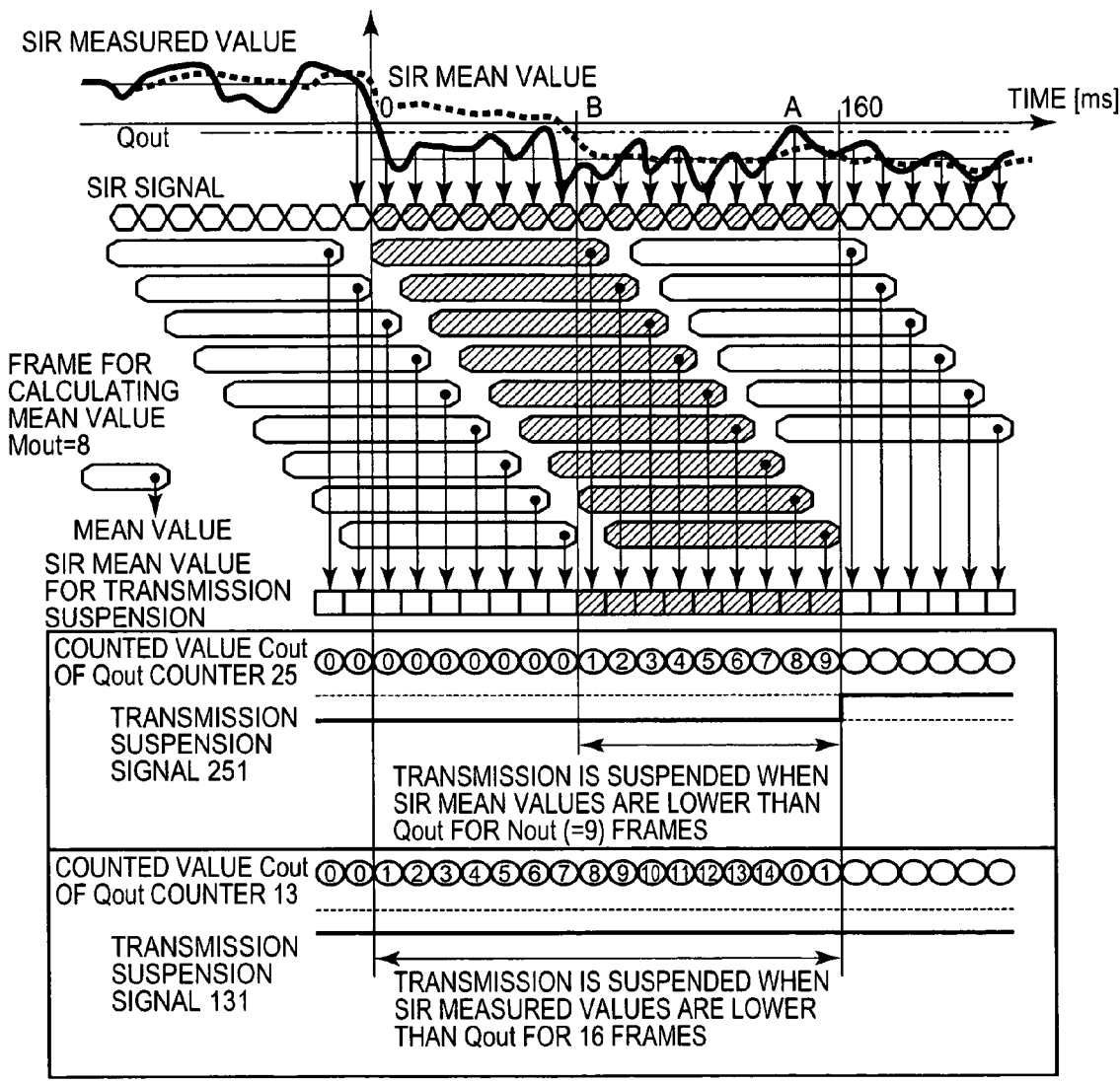
FIG. 3 is a diagram for describing an operation of the synchronization judging circuit of FIG. 2.

Referring to FIGS. 2 and 3, the description will proceed to a synchronization judging circuit according to a first embodiment of this invention.

FIG. 2 is a block diagram showing a configuration of the synchronization judging circuit used in a cellular phone of a W-CDMA system using a DPCCH and a DPDCH. The circuit of FIG. 2 includes an SIR measuring portion 21, a parameter memory 22, an SIR averaging portion 23, a Qin counter 24, a Qout counter 25 and a transmission controller 26. The SIR averaging portion 23 is connected to the SIR measuring portion 21 and the parameter memory 22. The Qin counter 24 and the Qout counter are individually connected to the parameter memory 22 and the averaging portion 23. The transmission controller 26 is connected to both of the Qin counter 24 and the Qout counter 25.

The SIR measuring portion 21 measures an SIR of the DPCCH/DPDCH included in a received signal from a base station at every frame. Whenever the SIR is measured at each frame, the SIR measuring portion 21 supplies an SIR signal 211 representing the measured SIR for the SIR averaging portion 23.

The parameter memory 22 memorizes at lest four parameters Min, Mout, Nin and Nout.

The parameter Min represents the number of frames to calculate a first arithmetic mean (or average) of the measured SIRs. The first arithmetic mean is used to decide to resume transmission. Thus, the parameter Min is called an SIR averaging number for transmission resumption.

The parameter Mout represents the number of frames to calculate a second arithmetic mean (or average) of the measured SIRs. The second arithmetic mean is used to decide to suspend the transmission. Thus, the parameter Mout is called an SIR averaging number for transmission suspension. The parameter Mout may be equal to the parameter Min.

The parameter Nin represents a first reference value to decide to resume the transmission. The parameter Nout represents a second reference value to decide to suspend the transmission. The parameter Nout may be equal to the parameter Nin.

The SIR averaging portion 23 previously gets the parameters Min and Mout from the parameter memory 22 and holds them. The SIR averaging portion 23 periodically receives the SIR signal 211 from the SIR measuring portion 21 at frame period. Upon receiving the SIR signal 211, the SIR averaging portion 23 calculates a moving average of a predetermined number of the measured SIRs. That is, the SIR averaging portion 23 calculates the first arithmetic mean of a series of the measured SIRs for the latest frames of the number represented by the parameter Min. Simultaneously, the SIR averaging portion 23 calculates the second arithmetic mean of the measured SIRs for the latest frames of the number represented by the parameter Mout. When the parameter Min and Mout are equal to each other, the first and the second arithmetic mean are equal to each other. Thus, the SIR averaging portion 23 calculates the first and the second arithmetic means at each frame. The first arithmetic mean is supplied to the Qin counter 24 as a mean value SIRin for transmission resumption. The second arithmetic mean is supplied to the Qout counter 25 as a mean value SIRout for transmission suspension.

The Qin counter 24 previously gets the parameter Nin from the parameter memory 22 and holds it. Furthermore, the Qin counter 24 previously holds a reference level Qin as a predetermined threshold requirement. The Qin counter 24 compares the mean value SIRin with the reference level Qin at each frame. When the mean value SIRin is larger than the reference level Qin, the Qin counter 24 increases a counted value thereof by one. To the contrary, when the mean value SIRin is equal to or smaller than the reference level Qin, the Qin counter 24 is cleared and the counted value returns to zero. In addition, the Qin counter 24 compares the counted value with the first reference value represented by the parameter Nin. When the counted value is equal to the first reference value of the parameter Nin, the Qin counter 24 supplies a transmission resumption signal 241 for the transmission controller 26.

On the other hand, the Qout counter 25 previously gets the parameter Nout from the parameter memory 22 and holds it. Furthermore, the Qout counter 25 previously holds a reference level Qout as a predetermined threshold requirement. The Qout counter 25 compares the mean value SIRout with the reference level Qout at each frame. When the mean value SIRout is smaller than the reference level Qout, the Qout counter 24 increases a counted value thereof by one. To the contrary, when the mean value SIRout is equal to or larger than the reference level Qout, the Qout counter 25 is cleared and the counted value returns to zero. In addition, the Qout counter 25 compares the counted value with the second reference value represented by the parameter Nout. When the counted value is equal to the second reference value of the parameter Nout, the Qout counter 25 supplies a transmission suspension signal 251 for the transmission controller 26.

The transmission controller 26 produces transmitter control signals 20 according to the transmission resumption signal 241 and the transmission suspension signal 251. In detail, in a case where transmission is executed, the transmission controller 26 produces the transmitter control signal 20 to suspend the transmission when it receives the transmission suspension signal 251. In this case, if the transmission controller 26 receives the transmission resumption signal 241 instead of the transmission suspension signal 251, it produces the transmitter control signal 20 to maintain the transmission. In another case where the transmission is suspended, the transmission controller 26 produces the transmitter control signal 20 to resume the transmission when it receives the transmission resumption signal 241. In this case, if the transmission controller 26 receives the transmission suspension signal 251 instead of the transmission resumption signal, it produces the transmitter control signal 20 to maintain the suspension of the transmission.

FIG. 3 is a diagram for describing operations of the SIR averaging portion 23 and the Qout counter 25 of FIG. 2. In an upper part of FIG. 3, a curved solid line represents a time variation of the measured SIR measured by the SIR measuring portion 23. As understood from FIG. 3, the measured SIR varies above the reference level Qout depicted by a chain double-dashed line before a time point "0" [ms]. Transmission condition deteriorates at about the time point "0" [ms] and then the measured SIR varies under the reference level Qout.

On the deteriorated transmission condition after the time point "0" [ms], the measured SIR has large dispersion (or short time variation). Accordingly, there is a case where the measured SIR at a certain time, such as a time point "A", has a value over the reference level Qout.

In FIG. 3, a series of hexagons under the curved solid line represents the SIR signal 211. Each of the hexagons corresponds to one frame. That is, the SIR signal 211 is produced at frame intervals and provides sixteen measured SIR values during 160 [ms] (or a hatched period from the time point of 0 [ms] to the time point of 160 [ms]). The fifteenth measured SIR value from the time point "0" corresponding to the measured SIR of the time point "A" is higher than the reference level Qout.

An arrangement of elongated octagons under the series of the hexagons represents series (or groups) of the measured SIRs which are used to calculate the mean values SIRout in the SIR averaging portion 23. Furthermore, a series of squares under the arrangement of the elongated octagons represents the mean values SIRout calculated by the SIR averaging portion 23.

In FIG. 3, the parameter Mout is set to "8". That is, the SIR averaging portion 23 calculates the mean value SIRout of the measured SIRs for 8 frames. For instance, the SIR averaging portion 23 uses the first to the eighth frames of the hatched period (or from the time point of 0 [ms] to the time point of 80 [ms]) to produce the mean value SIRout at the time point "B" (of the eighth frame). For the next frame, the SIR averaging portion 23 uses the second to the ninth frames of the hatched period to produce the mean value SIRout. Thus, the SIR averaging portion 23 calculates the mean values SIRout one after another, shifting the range of the measured SIRs for the calculation one by one. The first mean value based on the measured SIRs after the time point "0" is obtained at Mout-th frame from the time point "0".

A curved dotted line at the upper part of FIG. 3 represents a time variation of the mean value SIRout calculated by the SIR averaging portion 23. As shown in FIG. 3, the curved dotted line becomes lower than the reference level Qout after the time point "B". The dispersion of the mean value SIRout is smaller than that of the measured SIR depicted by the curved solid line.

In an upper side of double rectangular frames of FIG. 3, numerals in small circles represent time variation of the counted value Cout of the Qout counter 25. When the counted value Cout becomes equal to the parameter Nout (here, ="9"), the Qout counter 25 produces (or changes) the transmission suspension signal 251 as illustrated under the series of the small circles.

In this embodiment, because the sum of the parameters Mout and Nout is equal to "17", the transmission suspension signal is changed after 16 frames from the time point of 0 [ms]. The parameters Mout and Nout are used to change the timing of change of the transmission suspension signal. The dispersion of the mean value SIRout becomes small with increase of the parameter Mout. Consequently, synchronization judging operation of the synchronization judging circuit becomes more stable when the parameter Mout becomes large.

For reference, time variation of the counted value of the Qout counter 13 of the related synchronization judging circuit of FIG. 1 is illustrated in a lower side of double rectangular frames of FIG. 3. Though the measured SIR deteriorates after the time point of 0 [ms], the transmission suspension signal is not produced. This is because the measured SIR is larger than the reference level Qout at the time point "A". That is, the measured SIRs are not lower than the reference level Qout for continuous 16 frames. The Qout counter 13 is cleared at the time point "A" and the counted value is equal to "1" at the fifteenth frame from the time point "0".

A transmission resumption operation of the synchronization judging circuit is executed in the same way just like the transmission suspension operation mentioned above. In other words, the Qin counter 24 operates like the Qout counter 25 and there by the transmission resumption operation is executed. The description mentioned above for the transmission suspension can be used for the transmission resumption operation by substituting the Qout counter 25 with the Qin counter 24, the parameter Mout with the parameter Min, the parameter Nout with the parameter Nin, the transmission suspension signal with the transmission resumption signal, the counted value Cout of the Qout counter 25 with the counted value Cin of the Qin counter 24, the reference level Qout with the reference level Qin, and the judging inequality of "Qout<Cout (the counted value of the Qout counter 25)" with a judging inequality of "Qin>Cin (the counted value of the Qin counter 24)", respectively.

As mentioned above, the moving average of the measured SIRs is used to decide whether the transmission is to be suspended/resumed or not. Because the time dispersion of the moving average is smaller than that of the measured SIR, stable synchronization judging operation and transmission control can be executed. By setting proper parameters Min, Mout, Nin and Nout, the operation and the control can be stable.

Figure 4:
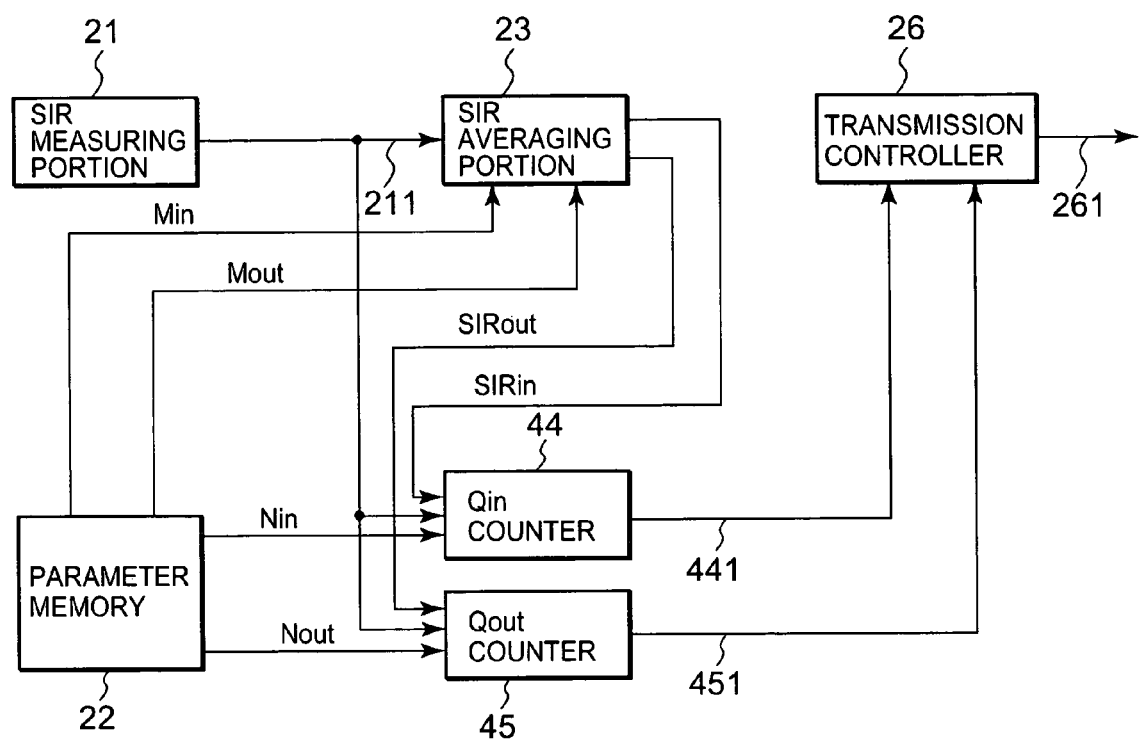
FIG. 4 is a block diagram of a synchronization judging circuit according to a second embodiment of this invention.

FIG. 4 is a block diagram showing a synchronization judging circuit according to a second embodiment of this invention. The circuit of FIG. 4 is similar to that of FIG. 2 except a point that the measured SIR signal 211 is supplied to a Qin counter 44 and a Qout counter 45. The similar parts are designated by the similar reference numerals.

The Qin counter 44 and the Qout counter 45 previously have parameters Lin and Lout, respectively. The parameters Lin and Lout may be memorized in the parameter memory 22. The Qout counter 45 operates as follows.

The Qout counter 45 receives the measured SIR signal 211 at each frame to memorize the measured SIRs for frames of the number which is at least one larger than the parameter Lout.

When the counted value of the Qout counter 44 is equal to or larger than the parameter Nout, the Qout counter 44 compares the measured SIR of the frame preceding by Lout frames from the current frame with the reference level Qout. When the measured SIR of the frame preceding by Lout frames is lower than the reference level Qout, the Qout counter 44 supplies the transmission suspension signal 441 to the transmission controller 26. When the measured SIR of the frame preceding by Lout frames is equal to or larger than the reference level Qout, the Qout counter 44 does not supply the transmission suspension signal 441 to the transmission controller 26.

Figure 5:
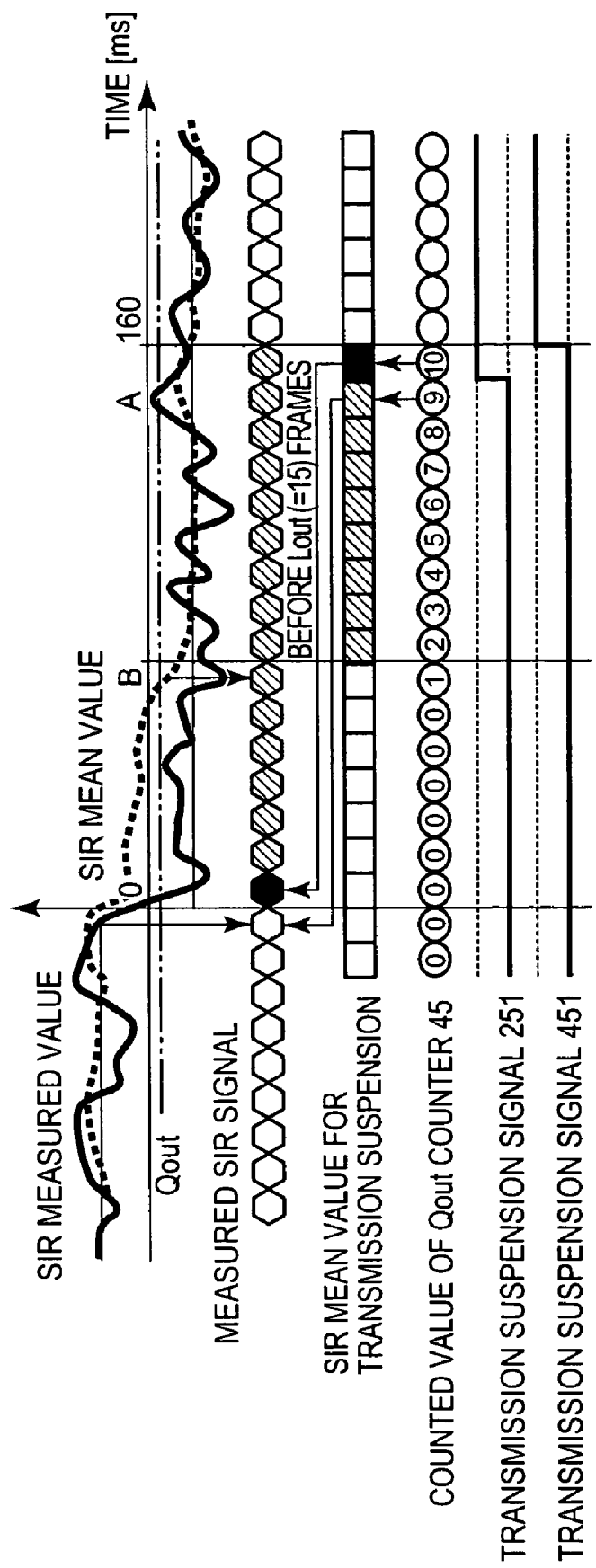
FIG. 5 is a diagram for describing an operation of the synchronization judging circuit of FIG. 4.

FIG. 5 is a diagram for describing operation of the Qout counter 45. Here, the parameters Mout, Nout and Lout are set to "8", "9" and "15", respectively. The curved dotted line showing the mean value SIRout becomes lower than the reference level Qout depicted by the chain double-dashed line at the time point "B". The Qout counter 45 starts counting up at the time point "B".

As shown in the second line from the bottom of FIG. 5, the Qout counter 25 of FIG. 2 produces the transmission suspension signal 251 when the counted value Cout becomes equal to the parameter Nout (=9). In this case, the transmission suspension signal is produced before a time lapse of 160 [ms] from when the measured SIR becomes lower than the reference level Qout.

On the contrary, the Qout counter 45 of FIG. 4 does not produces the transmission suspension signal 451 when the counted value Cout becomes equal to the parameter Nout (=9) as shown in the bottom line of FIG. 5. This is because the measured SIR of the frame preceding by Lout (=15) frames is larger than the reference level Qout. In the next frame, the counted value Cout becomes equal to "10" and the measured SIR of the frame preceding by Lout frames becomes lower than the reference level Qout. In this time, the Qout counter 45 produces the transmission suspension signal 451. Thus, the synchronization judging circuit of this embodiment can produces the transmission suspension signal after the time lapse of 160 [ms] from when the transmission condition deteriorates.

A transmission resumption operation of the synchronization judging circuit of FIG. 4 is executed in the same way just like the transmission suspension operation mentioned above. In other words, the Qin counter 44 operates like the Qout counter 45 and thereby the transmission resumption operation is executed. The description mentioned above for the transmission suspension can be used for the transmission resumption operation by substituting the reference level Qout with the reference level Qin, the counted value Cout with the counted value Cin, the parameters Nout and Lout with the parameters Nin and Lin, the mean value SIRout with the mean value SIRin, the transmission suspension signal with the transmission resumption signal, the Qout counter 45 with the Qin counter 44, and the judging inequality of "the measured SIR>Qout" with a judging inequality of "the measured SIR<Qin", respectively.

Figure 6:
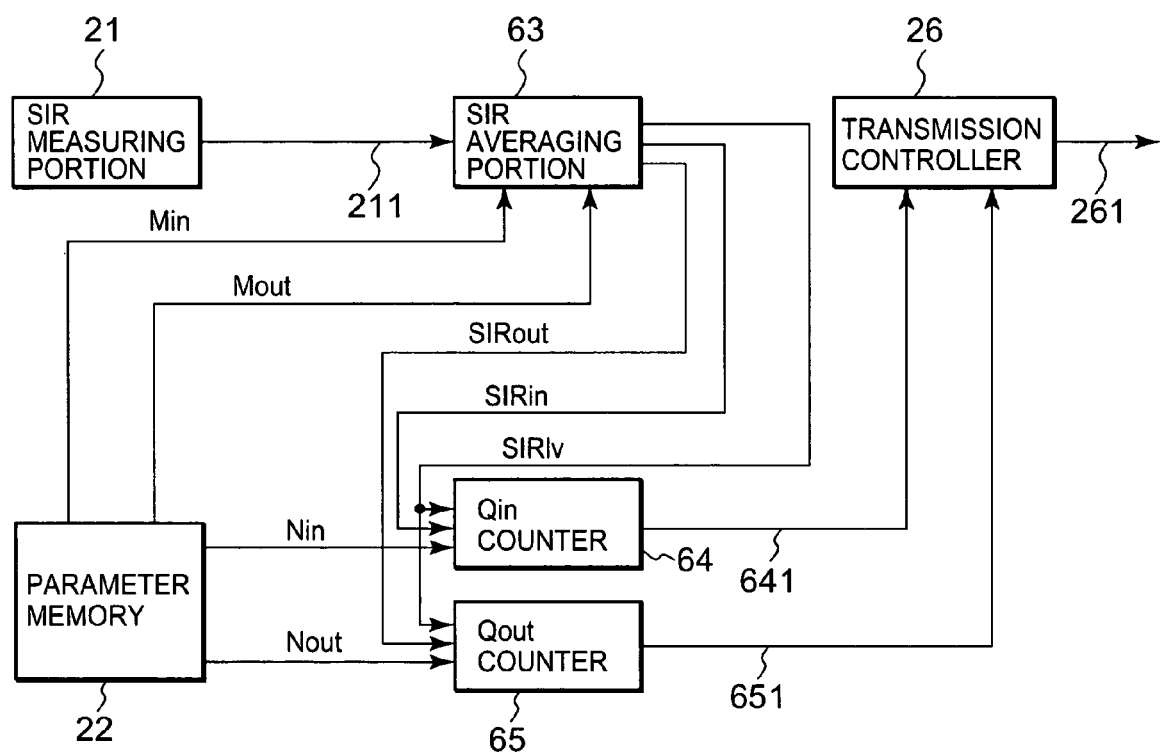
FIG. 6 is a block diagram of a synchronization judging circuit according to a third embodiment of this invention.

FIG. 6 shows a block diagram of a synchronization judging circuit according to a third embodiment of this invention. The circuit of FIG. 6 is similar to that of FIG. 4 except a point that a mean value SIRlv for level confirmation is supplied from a SIR averaging portion 63 to the Qin counter 64 and the Qout counter 65.

The SIR averaging portion 63 previously has a parameter Mlv. The parameter Mlv is independent of the parameters Min and Mout. The parameter Mlv may be memorized in the parameter memory 22. The SIR averaging portion 63 calculates the mean value SIRlv of the measured SIRs for frames of the number represented by the parameter Mlv.

The Qout counter 65 operates like the Qout counter 45 of FIG. 4 though the mean value SIRlv is used as a substitute of the measured value SIR. The same is true on the Qin counter 64. In this embodiment, the parameters Lin and Lout are decided according to the parameter Mlv. When the parameters Lin and Lout are properly decided, the synchronization judging circuit can execute the synchronization judgment stably in comparison with that of the second embodiment.

Next, a synchronization judging circuit according to a fourth embodiment of this invention will be described with reference to FIGS. 7 and 8.

Figure 7:
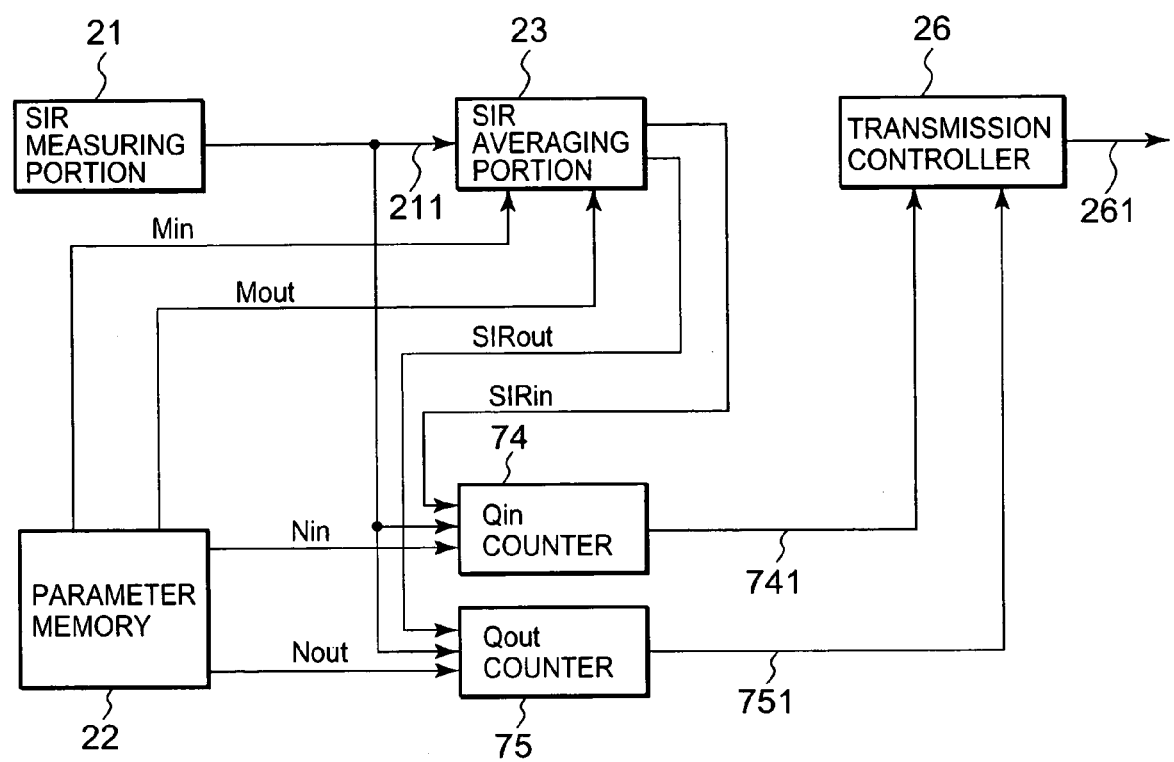
FIG. 7 is a block diagram of a synchronization judging circuit according to a fourth embodiment of this invention.

The circuit of FIG. 7 is similar to that of FIG. 4. However, the Qin and Qout counters 74 and 75 of FIG. 7 are different from the counters 44 and 45 of FIG. 4 in operation.

Figure 8:
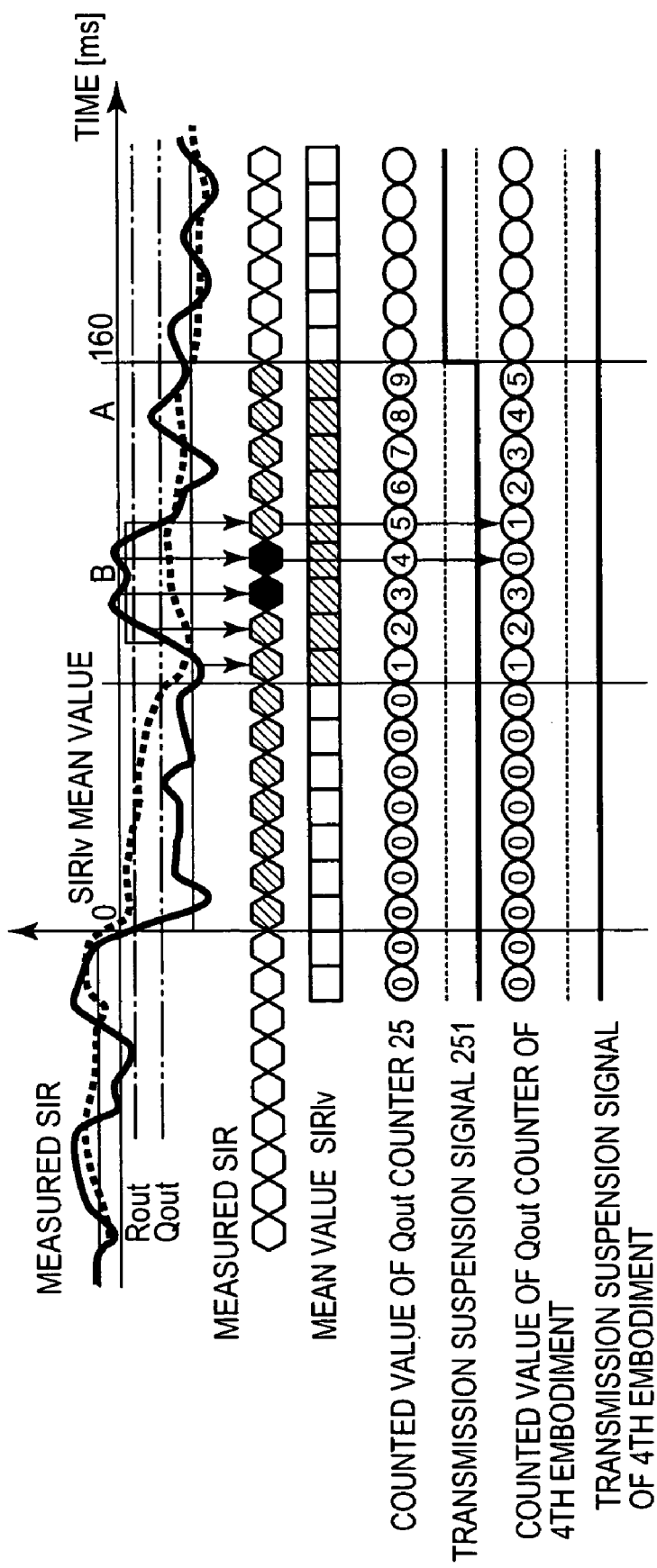
FIG. 8 is a diagram for describing an operation of the synchronization judging circuit of FIG. 6.

In FIG. 8, the measured SIR remarkably exceeds the reference level Qout near the time point "B". However, the mean value SIRout keeps under the reference level Qout near the time point "B". In these conditions, the counted value of the Qout counter 25 of FIG. 2 varies as illustrated in fourth line from the bottom of FIG. 8. As a result, the transmission suspension signal 251 is produced by the Qout counter 25 at the time of 160 [ms] as illustrated in third line from the bottom of FIG. 8.

On the contrary, the counted value of the Qout counter 75 of FIG. 7 varies as illustrated in second line from the bottom of FIG. 8. Furthermore, the Qout counter 75 does not produce the transmission suspension signal 751 at the time point 160 [ms] as shown in bottom line of FIG. 8. To realize these operations, the Qout counter 75 previously has the parameters Rout and Kout. The parameter Rout represents a limit level higher than the reference level Qout. The parameter Kout represents a limit number of continuous frames. The parameter Kout is equal to "2" in this embodiment. These parameters Rout and Kout may be memorized in the parameter memory 22.

Concretely, the Qout counter 75 not only compares the mean value SIRout with the reference level Qout but also compares the measured SIR with the parameter Rout at each frame. As a rule, the Qout counter 75 increases the counted value Cout by one when the mean value SIRout is lower than the reference level Qout at each frame. However, the Qout counter 75 is cleared to return the counted value Cout to "0" when the measured SIR(s) is (/are) larger than the parameter Rout for continuos Kout (here, =2) frames. After that, if the measured SIR becomes lower than the reference level Qout without an excess of the mean value SIRout over the reference level Qout, the Qout counter 75 counts the number of frame which the mean value SIRout is lower than the reference level Qout. Thus, in this embodiment, the transmission suspension signal is not produced at the time of 160 [ms].

Regarding to resumption operation of this embodiment, it can be understood by changing terms of the Qout counter 75, the reference revel Qout, the counted value Cout, and the parameters Rout and Kout into the Qin counter 74, the reference revel Qin, the counted value Cin, and the parameters Rin and Kin, respectively. The parameter Rin is decided to be lower than the reference level Qin.

As a substitute for the parameters Rin and Rout, parameters Din and Dout may be used. The parameter Din represents a difference between the reference level Qin and the parameter Rin while the parameter Dout represents a difference between the reference level Qout and the parameter Rout. In a case where plural sets of the parameters Rin, Rout, Qin and Qout are necessary for plural bearer services, one set of the parameters Din and Dout can be used instead of the plural sets of parameters Rin and Rout for all of the bearer services in common. Accordingly, the number of parameters can be decreased in this case in comparison with the fourth embodiment.

A synchronization judging circuit according to a fifth embodiment of this invention has a configuration similar to that of FIG. 6. The circuit of this embodiment operates like that of FIG. 7. In this embodiment, the mean value SIRlv is used instead of the measured SIR supplied to the Qin and the Qout counters 74 and 75 of FIG. 7. Because the mean value SIRlv is smaller than the measured SIR in dispersion, the parameters Kin and Kout can be unnecessary (i.e. Kin, Kout=1). That is, the Qout counter of this embodiment may be cleared when the mean value SIRlv is larger than the parameter Rout. Furthermore, the Qin counter of this embodiment may be cleared when the mean value SIRlv is smaller than the parameter Rin.

A synchronization judging circuit according to a sixth embodiment of this invention has a configuration similar to that of FIG. 7. However, the Qin and the Qout counters of this embodiment are different from those of FIG. 7 in operation.

Figure 9:
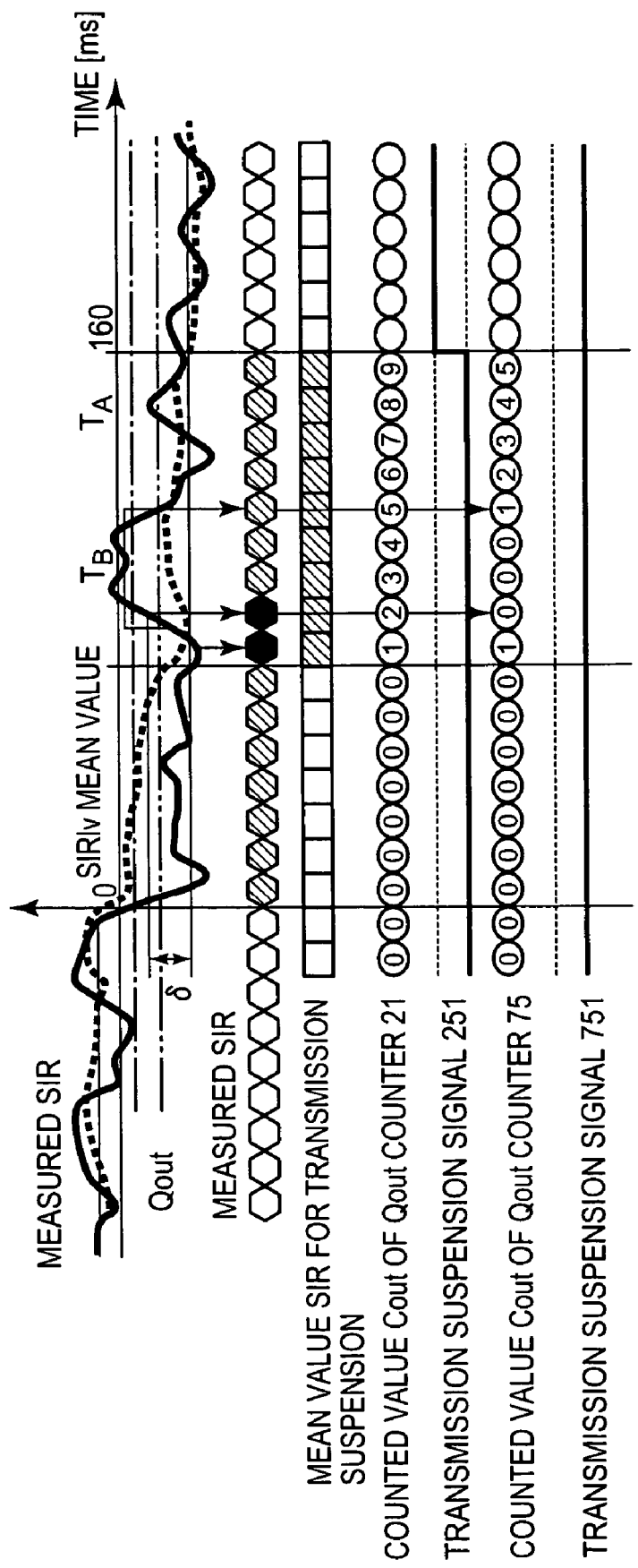
FIG. 9 is a diagram for describing an operation of the synchronization judging circuit according to a sixth embodiment of this invention.

The Qin and the Qout counters of this embodiment use a difference $\delta$ between the measured SIRs of continuos two frames to judges whether to be cleared or not. For example, when the difference $\delta$ is larger than a threshold represented by a parameter Eout, the Qout counter of this embodiment is cleared as shown in second line from the bottom of FIG. 9. Similarly, when the difference $\delta$ is smaller than a threshold represented by a parameter Ein, the Qin counter of this embodiment is cleared.

Alternatively, a difference $\delta'$ between continues two mean values SIRlv maybe used in a synchronization judging circuit according to a seventh embodiment of this invention. The circuit of this embodiment has a configuration similar to that of FIG. 6.

Figure 10:
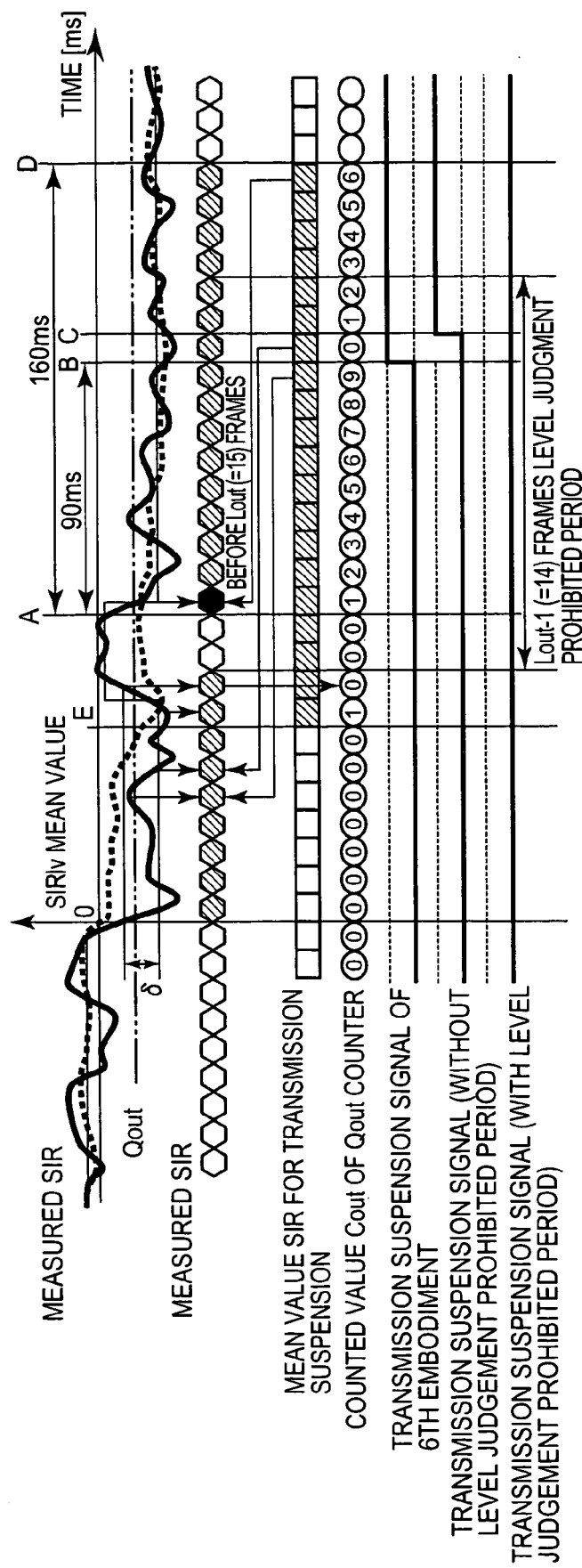
FIG. 10 is a diagram for describing an operation of a circuit according to a combination of the second embodiment and the sixth embodiment.

The second embodiment or the third embodiment can be combined with one of the fourth to the seven embodiments. FIG. 10 is a diagram for describing an operation of a circuit according to a eighth embodiment of this invention. This embodiment corresponds to a combination of the second embodiment and the sixth embodiment.

In FIG. 10, the parameters Mout, Nout and Lout are set to "8", "9" and "15", respectively.

Though the Qout counter counts "1" at the time point "E", the Qout counter of this embodiment is cleared in the following frame. This is because the difference $\delta$ is over the threshold.

As illustrated in the third line from the bottom of FIG. 10, in the sixth embodiment, the transmission suspension signal is produced after the counted value of the Qout counter is equal to "9". On the contrary, in this embodiment, even if the counted value of the Qout counter is equal to "9", the Qout counter does not produce the transmission suspension signal as illustrated in the second line from the bottom of FIG. 10. This is because the measured SIR of the frame preceding by Lout frames is larger than the reference level Qout. When the counted value of the Qout counter is equal to "10", the measured SIR of the frame preceding by Lout frames is smaller than the reference level Qout. Therefore, the Qout counter produces the transmission suspension signal when the counted value is equal to "10". Thus, the circuit according to this embodiment can elongate time from when the Qout counter is cleared to when the transmission suspension signal is produced in comparison with the circuit according to the sixth embodiment.

According to the description mentioned above, a period of Lout+1 (=16, in FIG. 10) frames is not assured as a period from when the measured SIR decreases under the reference level to when the transmission suspension signal is produced. To avoid this situation, it is desirable to set a level judgement prohibited period of Lout−1 (=14, in FIG. 10) frames. The level judgment prohibited period is set at after the counted value is cleared because of the difference $\delta$. The Qout counter does not compare the measured SIR of the frame preceding Lout frames with the reference level Qout during the level judgment prohibited period. Consequently, the comparison is made against the measured SIR obtained after the Qout counter is cleared. Therefore, the transmission suspension signal is not produced during 160 [ms] (=16 frames) after the communication condition deteriorates.

The resumption operation is executed in the same way as the suspension operation mentioned above. A level judgement prohibited period of Lin−1 frames is set at after the Qin counter is cleared.

What is claimed is:

1. A synchronization judging circuit comprising:
   a measuring portion for measuring a signal to interference power ratio of a received signal at each frame;
   an averaging portion for calculating a moving average of a series of signal to interference power ratios for a predetermined number of frames to produce a mean value at each frame, said averaging portion comprising,
      a first calculation portion for calculating a first arithmetic mean of a series of the measured signal interference power ratios for the latest frames of a number represented by a parameter Min; and
      a second calculation portion for calculating a second arithmetic mean of the measured signal interference power ratios for the latest frames of a number represented by a parameter Mout; and
   a counter for counting a number of consecutive frames each of which the mean value meets a predetermined threshold requirement; wherein:
   said counter compares a counted value with a predetermined threshold value to decide whether to perform a transmission control operation or not.

2. A synchronization judging circuit as claimed in claim 1, wherein the received signal is transmitted through a dedicated physical control channel or a dedicated physical data channel.

3. A synchronization judging circuit as claimed in claim 1, wherein the counter produces a transmission control signal as the transmission control operation when the counted value is equal to the predetermined threshold value.

4. A synchronization judging circuit as claimed in claim 1, wherein:
   said counter judges whether the signal to interference power ratio of a frame preceeding by predetermined frame periods meets the predetermined threshold requirement or not before the transmission control operation, and performs the transmission control operation only when the signal to interference power ratio of the frame preceding by the predetermined frame periods meets the predetermined threshold requirement.

5. A synchronization judging circuit as claimed in claim 4, wherein:
said counter is cleared when a predetermined number of continuous frames each of which the signal to interference power ratio is over/under a predetermined limit level are detected, and suspends judgment whether the signal to interference power ratio of the frame preceding by the predetermined frame periods meets the predetermined threshold requirement or not for a predetermined time period.

6. A synchronization judging circuit as claimed in claim 4, wherein:
said counter is cleared when a predetermined number of continuous frames each of which the mean value is over/under a predetermined limit level are detected, and suspends judgment whether the signal to interference power ratio of the frame preceding by the predetermined frame periods meets the predetermined threshold requirement or not for a predetermined time period.

7. A synchronization judging circuit as claimed in claim 4, wherein:
said counter is cleared when a difference between continuous two signal to interference power ratios is larger than a predetermined range, and suspends judgment whether the signal to interference power ratio of the frame preceding by the predetermined frame periods meets the predetermined threshold requirement or not for a predetermined time period.

8. A synchronization judging circuit as claimed in claim 1, wherein:
said counter judges whether the mean value obtained at a frame preceding by predetermined frame periods meets the predetermined threshold requirement or not before the transmission control operation, and performs the transmission control operation only when the mean value obtained at the frame preceding by the predetermined frame periods meets the predetermined threshold requirement.

9. A synchronization judging circuit as claimed in claim 8, wherein:
said counter is cleared when a predetermined number of continuous frames each of which the signal to interference power ratio is over/under a predetermined limit level are detected, and suspends judgment whether the mean value obtained at the frame preceding by the predetermined frame periods meets the predetermined threshold requirement or not for a predetermined time period.

10. A synchronization judging circuit as claimed in claim 8, wherein:
said counter is cleared when a predetermined number of continuous frames each of which the mean value is over/under a predetermined limit level are detected, and suspends judgment whether the mean value obtained at the frame preceding by the predetermined frame periods meets the predetermined threshold requirement or not for a predetermined time period.

11. A synchronization judging circuit as claimed in claim 8, wherein:
said counter is cleared when a difference between continuous two signal to interference power ratios is larger than a predetermined range, and suspends judgment whether the mean value obtained at the frame preceding by the predetermined frame periods meets the predetermined threshold requirement or not for a predetermined time period.

12. A synchronization judging circuit as claimed in claim 1, wherein:
said counter is cleared when a predetermined number of continuous frames each of which the signal to interference power ratio is over/under a predetermined limit level are detected.

13. A synchronization judging circuit as claimed in claim 1, wherein:
said counter is cleared when a predetermined number of continuous frames each of which the mean value is over/under a predetermined limit level are detected.

14. A synchronization judging circuit as claimed in claim 1, wherein:
said counter is cleared when a difference between continuous two signal to interference power ratios is larger than a predetermined range.

15. A cellular phone including a synchronization judging circuit, said synchronization judging circuit comprising:
a measuring portion for measuring a signal to interference power ratio of a received signal at each frame;
an averaging portion for calculating a moving average of a series of signal to interference power ratios for a predetermined number of frames to produce a mean value at each frame, said averaging portion comprising,
a first calculation portion for calculating a first arithmetic mean of a series of the measured signal interference power ratios for the latest frames of a number represented by a parameter Min; and
a second calculation portion for calculating a second arithmetic mean of the measured signal interference power ratios for the latest frames of a number represented by a parameter Mout; and
a counter for counting a number of consecutive frames each of which the mean value meets a predetermined threshold requirement; wherein:
said counter compares a counted value with a predetermined threshold value to decide whether to perform a transmission control operation or not.

16. A cellular phone as claimed in claim 15, wherein the received signal is transmitted through a dedicated physical control channel or a dedicated physical data channel.

17. A cellular phone as claimed in claim 15, wherein the counter produces a transmission control signal as the transmission control operation when the counted value is equal to the predetermined threshold value.

18. A cellular phone as claimed in claim 15, wherein:
said counter judges whether the signal to interference power ratio of a frame preceding by predetermined frame periods meets the predetermined threshold requirement or not before the transmission control operation, and performs the transmission control operation only when the signal to interference power ratio of the frame preceding by the predetermined frame periods meets the predetermined threshold requirement.

19. A cellular phone as claimed in claim 18, wherein:
said counter is cleared when a predetermined number of continuous frames each of which the signal to interference power ratio is over/under a predetermined limit level are detected, and suspends judgment whether the signal to interference power ratio of the frame preceding by the predetermined frame periods meets the predetermined threshold requirement or not for a predetermined time period.

20. A cellular phone as claimed in claim 18, wherein:
said counter is cleared when a predetermined number of continuous frames each of which the mean value is over/under a predetermined limit level are detected, and suspends judgment whether the signal to interference power ratio of the frame preceding by the predetermined frame periods meets the predetermined threshold requirement or not for a predetermined time period.

21. A cellular phone as claimed in claim 18, wherein:
said counter is cleared when a difference between continuous two signal to interference power ratios is larger than a predetermined range, and suspends judgment whether the signal to interference power ratio of the frame preceding by the predetermined frame periods meets the predetermined threshold requirement or not for a predetermined time period.

22. A cellular phone as claimed in claim 15, wherein:
said counter judges whether the mean value obtained at a frame preceding by predetermined frame periods meets the predetermined threshold requirement or not before the transmission control operation, and performs the transmission control operation only when the mean value obtained at the frame preceding by the predetermined frame periods meets the predetermined threshold requirement.

23. A cellular phone as claimed in claim 22, wherein:
said counter is cleared when a predetermined number of continuous frames each of which the signal to interference power ratio is over/under a predetermined limit level are detected, and suspends judgment whether the mean value obtained at the frame preceding by the predetermined frame periods meets the predetermined threshold requirement or not for a predetermined time period.

24. A cellular phone as claimed in claim 22, wherein:
said counter is cleared when a predetermined number of continuous frames each of which the mean value is over/under a predetermined limit level are detected, and suspends judgment whether the mean value obtained at the frame preceding by predetermined frame periods meets the predetermined threshold requirement or not for a predetermined time period.

25. A cellular phone as claimed in claim 22, wherein:
said counter is cleared when a difference between continuous two signal to interference power ratios is larger than a predetermined range, and suspends judgment whether the mean value obtained at the frame preceding by the predetermined frame periods meets the predetermined threshold requirement or not for a predetermined time period.

26. A cellular phone as claimed in claim 15, wherein:
said counter is cleared when a predetermined number of continuous frames each of which the signal to interference power ratio is over/under a predetermined limit level are detected.

27. A cellular phone as claimed in claim 15, wherein:
said counter is cleared when a predetermined number of continuous frames each of which the mean value is over/under a predetermined limit level are detected.

28. A cellular phone as claimed in claim 15, wherein:
said counter is cleared when a difference between continuous two signal to interference power ratios is larger than a predetermined range.

* * * * *